(12) United States Patent
Virkler et al.

(10) Patent No.: US 8,734,112 B2
(45) Date of Patent: May 27, 2014

(54) ASYMMETRICAL ROTOR BLADE SLOT ATTACHMENT

(75) Inventors: Scott D. Virkler, Ellington, CT (US); Raymond S. Hummel, Newington, CT (US)

(73) Assignee: United Technologies Corporation, Hartford, CT (US)

( * ) Notice: Subject to any disclaimer, the term of this patent is extended or adjusted under 35 U.S.C. 154(b) by 727 days.

(21) Appl. No.: 12/956,040

(22) Filed: Nov. 30, 2010

(65) Prior Publication Data

US 2012/0134834 A1 May 31, 2012

(51) Int. Cl.
*F01D 5/30* (2006.01)

(52) U.S. Cl.
USPC ............... 416/219 R; 416/204 A; 416/244 A; 416/248

(58) Field of Classification Search
USPC ...... 416/219 R, 220 R, 204 A, 223 A, 244 A, 416/248
See application file for complete search history.

(56) References Cited

U.S. PATENT DOCUMENTS

| | | | |
|---|---|---|---|
| 3,045,968 A | 7/1962 | Willis | |
| 3,689,176 A * | 9/1972 | Howell et al. | ............... 416/96 R |
| 4,460,315 A | 7/1984 | Tseng et al. | |
| 5,310,318 A | 5/1994 | Lammas | |
| 5,395,213 A * | 3/1995 | Stenneler | ................. 416/219 R |
| 5,575,623 A | 11/1996 | Christensen et al. | |
| 5,580,218 A | 12/1996 | Nguyen et al. | |
| 5,584,658 A | 12/1996 | Stenneler | |
| 6,767,168 B2 | 7/2004 | Miller | |
| 7,503,751 B2 | 3/2009 | Arrieta | |
| 2009/0257877 A1 | 10/2009 | Alvanos et al. | |
| 2010/0209252 A1 | 8/2010 | Labelle | |

FOREIGN PATENT DOCUMENTS

EP 2110514 10/2009

OTHER PUBLICATIONS

European Search Report, EP Application No. 11 19 1276, dated Apr. 12, 2012.

* cited by examiner

*Primary Examiner* — Ned Landrum
*Assistant Examiner* — Justin Seabe
(74) *Attorney, Agent, or Firm* — Carlson, Gaskey & Olds

(57) ABSTRACT

A gas turbine engine includes a disk having an annular hub circumscribed about a centerline with an annular web extending radially outward from the hub to an annular rim. A multiple of slots extend generally axially through the rim and at least one of the multiple of slots having an asymmetric slot root for lower stress and higher service life.

12 Claims, 3 Drawing Sheets

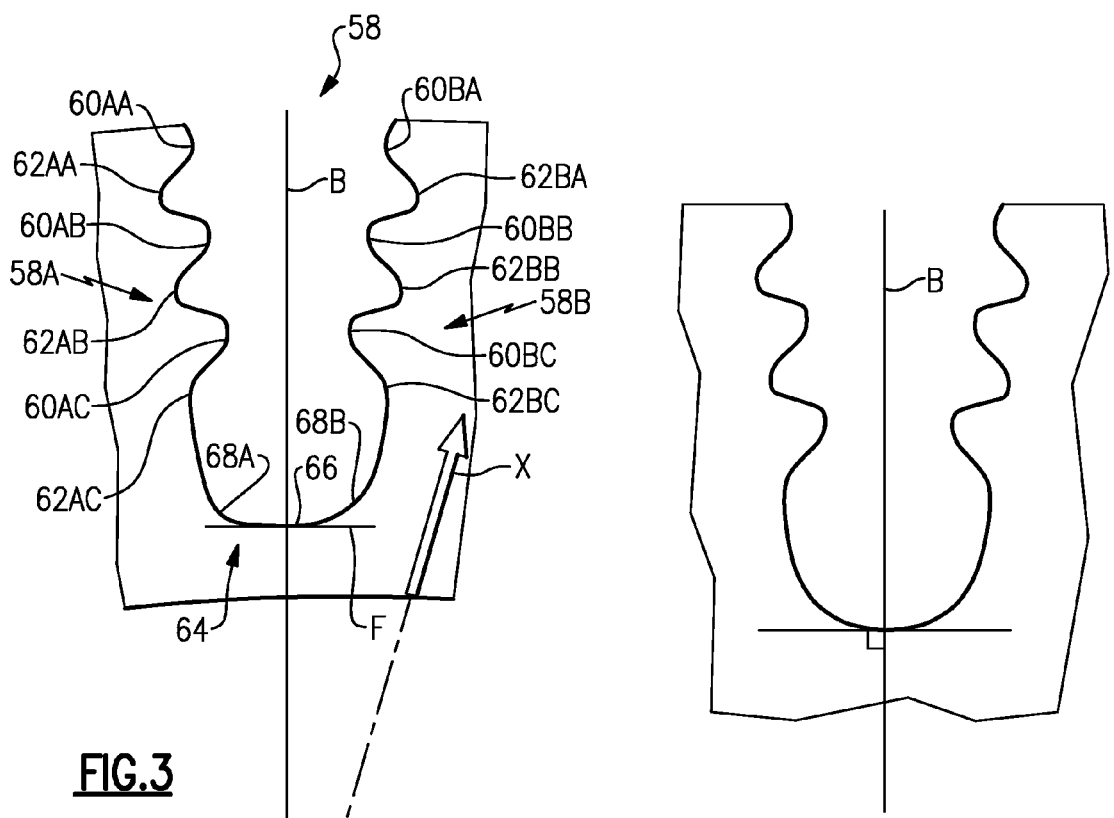
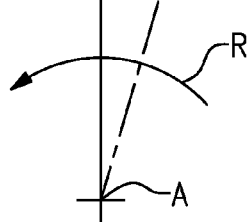
FIG.4
Related Art
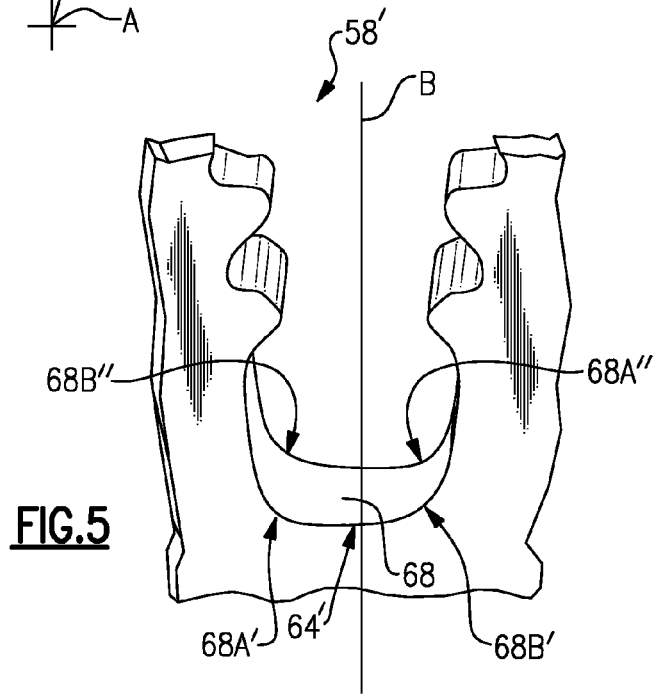

ASYMMETRICAL ROTOR BLADE SLOT ATTACHMENT

BACKGROUND

The present application relates to a gas turbine engine, and more particularly to a rotor blade attachment thereof.

Gas turbine engines include a multiple of rotor assemblies within fan compressor and turbine sections. Each rotor assembly has a multitude of blades attached about a circumference of a rotor disk. Each blade includes an attachment section, a platform section, and an airfoil section that extends radially outwardly from the platform section. Each of the blades is typically axially received into a rotor disk rim through a fir-tree-type attachment section, and may be locked into place.

Turbine rotors, especially, operate in a difficult environment at high speeds and high temperatures.

SUMMARY

A rotor disk for a gas turbine engine according to an exemplary aspect of the present invention includes a rim that defines a multiple of slots, at least one of the multiple of slots having an asymmetric slot root.

A blade for a gas turbine engine according to an exemplary aspect of the present invention includes a blade attachment section mountable within a rotor blade slot having an asymmetric slot root.

A method of reducing a stress within a rotor disk according to an exemplary aspect of the present invention includes locating a first fillet of an asymmetrical slot root circumferentially opposite a peak stress location.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 3 is an expanded sectional view of a rotor disk illustrating an asymmetric slot root according to one non-limiting embodiment;

FIG. 4 is an expanded sectional view of a rotor disk illustrating a RELATED ART attachment between one blade and rotor disk; and FIG. 5 is an expanded perspective view of an asymmetric slot root according to another non-limiting embodiment.

DETAILED DESCRIPTION OF THE EXEMPLARY EMBODIMENTS

Figure 1:
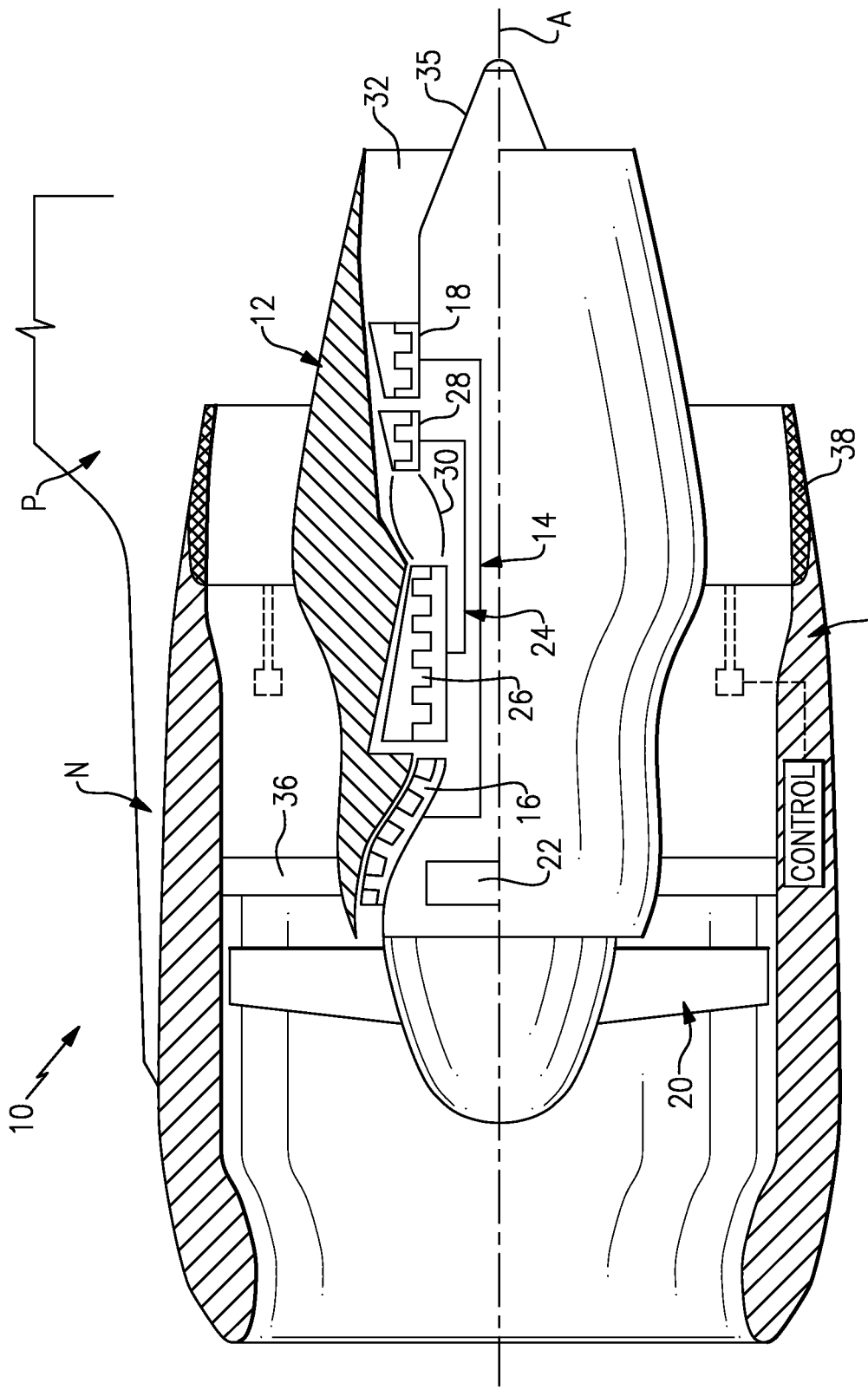
FIG. 1 is a general schematic illustration of a gas turbine engine.

FIG. 1 illustrates a partial fragmentary schematic view of a gas turbofan engine 10 suspended from an engine pylon P within an engine nacelle assembly N. While a two spool high bypass turbofan engine with a geared architecture is schematically illustrated in the disclosed non-limiting embodiment, it should be understood that the disclosure is applicable to other gas turbine engine configurations, e.g., single spool, three spool, geared or not.

The turbofan engine 10 generally includes a core engine within a core nacelle 12 that houses a low spool 14 and high spool 24 which rotate about an axis of rotation A. The low spool 14 generally includes a low pressure compressor 16 and low pressure turbine 18. The low spool 14 also drives a fan section 20 either directly or through a geared architecture 22. The high spool 24 generally includes a high pressure compressor 26 (illustrated as axial, but may be centrifugal) and high pressure turbine 28. A combustor 30 is arranged between the high pressure compressor 26 and high pressure turbine 28.

Airflow enters an inlet 34, which at least partially surrounds the nacelle 12 and a portion of the airflow, referred to as core airflow, is communicated into the engine core. Core airflow compressed by the low pressure compressor 16 and the high pressure compressor 26 is mixed with the fuel in the combustor 30 then expanded over the high pressure turbine 28 and low pressure turbine 18. The turbines 28, 18, coupled for rotation with the compressors 26, 16, and the fan section 20 through the optional geared architecture 22, are thereby driven in response to the expansion. A core engine exhaust exits through a nozzle 32.

The nacelle 12 is supported within the fan nacelle 34 by circumferentially spaced structures often referred to as Fan Exit Guide Vanes (FEGVs) 36 to define a generally annular bypass flow path between the core nacelle 12 and the fan nacelle 34. The engine 10 generates a high bypass flow communicated through generally annular bypass flow path then discharged through a fan nozzle 38, which in the disclosed non-limiting embodiment, may selectively define a variable area fan nozzle exit area, between the fan nacelle 34 and the core nacelle 12.

The engine 10 in the disclosed, non-limiting embodiment is a high-bypass geared architecture aircraft engine with a bypass ratio greater than ten (10:1) and a fan diameter significantly larger than that of the low pressure compressor 16. The geared architecture 22 may include an epicycle gear system such as a planetary gear system or other gear system with a gear reduction ratio of greater than 2.5:1. It should be understood that the above parameters are only exemplary of one embodiment of a geared architecture engine and that the present application is applicable to other gas turbine engines such as direct drive turbofans.

Figure 2:
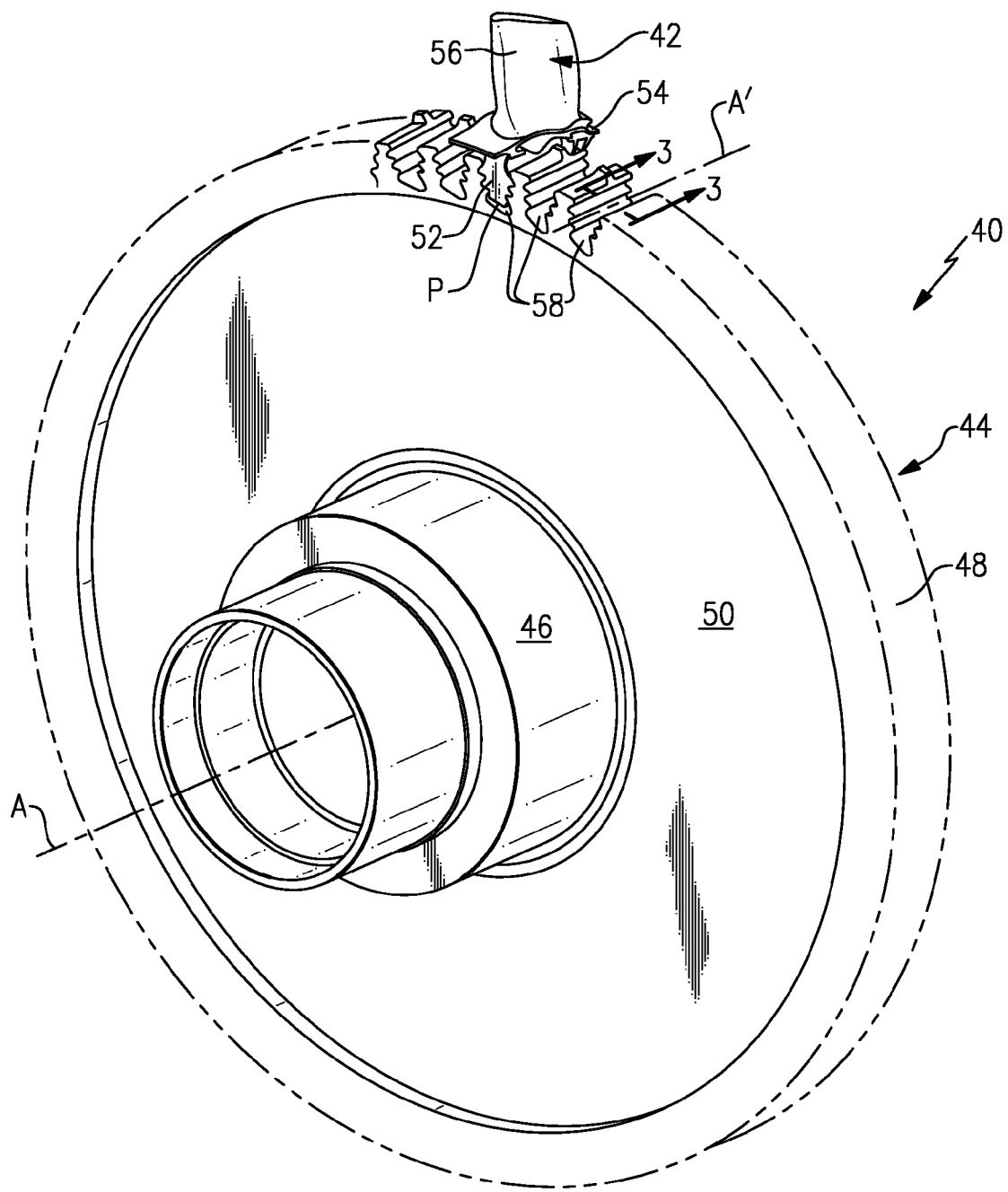
FIG. 2 is an expanded perspective view of a blade mounted to a rotor disk.

With reference to FIG. 2, a turbine rotor disk assembly 40 such as that provided within the high pressure turbine 28 or the low pressure turbine 18 generally includes a plurality of blades 42 circumferentially disposed around a rotor disk 44. It should be understood that a multiple of disks may be contained within each engine section and that although a turbine rotor disk assembly 40 is illustrated and described in the disclosed embodiment, other engine sections will also benefit herefrom.

The rotor disk 44 generally includes a hub 46 a rim 48, and a web 50 which extends therebetween. Each blade 42 generally includes an attachment section 52, a platform section 54 and an airfoil section 56. Each of the blades 42 is received within a respective rotor blade slot 58 formed within the rim 48 of the rotor disk 44 along a rotor blade generally radial blade axis B (FIG. 3).

Due to the angle of the blade platform section 54, a slash angle A' may be incorporated into the rim 48 to facilitate blade manufacture and thereby reduce the amount of twist in the blade core from the attachment section 52 to the airfoil section 56. The slash angle A' locates the rotor blade slot 58 through the rim 48 at an angle that is non-parallel to the axis of rotation A. Although effective, the slash angle A' may generate a cross corner stress effect within the rotor disk 44. Additionally, for a cooled airfoil typical of the turbine rotor disk assembly 40, the side where the cooling air enters a disk plenum area P below the blade attachment section 52 responds transiently faster than the opposite side which may lead to higher stress levels where air enters the slot 58. This effect, along with the slash angle drives the peak stress off center from the blade slot 58 and may result in a stress imbalance, with the peak stress location biased to one end of the blade slot and off center to the slot bottom.

With reference to FIG. 3, each rotor blade slot 58 defines a first side 58A and a second side 58B on either side of the rotor blade longitudinal axis B. In one non-limiting embodiment, the first side 58A is the suction side and the second side 58B is a pressure side relative a rotational direction R of the rotor disk 44. The first side 58A includes a multiple of lobes 60AA, 60AB, 60AC and a multiple of pockets 62AA, 62AB, 62AC. The second side 58B includes a multiple of lobes 60BA, 60BB, 60BC and a multiple of pockets 62BA, 62BB, 62BC.

The first side 58A meets the second side 58B at a slot root 64. The slot root 64 is generally defined by a slot floor 66 having a first fillet 68A which blends the first side 58A into the floor 66 and a second fillet 68B which blends the second side 58B into the slot floor 66. The first fillet 68A defines a radius different than the second fillet 68B to define an asymmetric slot root 64. That is, the slot root 64 may be defined from pocket 62AC to pocket 62BC and thereby include fillets 68A, 68B. It should be understood that the term "fillet" as utilized herein, may encompass a single constant radius of curvature as well as a multiple of radii. In the disclosed non-limiting embodiment, the first fillet 68A defines a radius smaller than the second fillet 68B. The asymmetrical slot root 64 locates the first fillet 68A circumferentially opposite a peak stress location. The second fillet 68B is located adjacent to or at the peak stress location. In addition, the asymmetrical slot root 64 defines a line F tangent to the slot floor 66 at the blade longitudinal axis B, which need not be perpendicular to the blade longitudinal axis B.

As a hoop stress extends radially outward (illustrated schematically by arrow X) through, for example, a lug post between each blade slot 58, the hoop component of the stress dies out. The movement of the peak stress location radially outward relative the adjacent inner most tangent portion of the blade slot 58 reduces the hoop component of the stress within the rotor disk 44 generally at the peak stress location adjacent to or at the second fillet. The asymmetric shape of the asymmetrical slot root 64 reduces stress at the peak stress end of the blade slot 58 but will have the opposite effect at the other end of the blade slot 58 due to the cross corner stress effect, however, this stress will still be lower than the peak stress as the overall stress levels are lower at this end of the blade slot 58. That is, the non-perpendicular arrangement disclosed herein effectively shields the peak stress location of the blade slot 58 from the hoop stress to further improve rotor disk life at the otherwise limiting location relative to a conventional symmetric slot (FIG. 4; RELATED ART).

With reference to FIG. 5, another non-limiting embodiment of a rotor blade slot 58' includes a slot root 64' in which the fillets 68A', 68B' are axially asymmetric along axis A', i.e., along the slot extrusion length direction. That is, the slot root 64' is defined from a relatively larger fillet 68B' to a relatively smaller fillet 68A" on one side of the slot 58' and from a relatively smaller fillet 68A' to a relatively larger fillet 68B" on an opposite side of the slot 58'. It should be understood that fillets 68A', 68B' may be equivalent or different than respective fillets 68A", 68B".

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor disk for a gas turbine engine comprising:
a rim that defines a multiple of rotor blade slots, at least one of said multiple of rotor blade slots having an asymmetric slot root;
wherein said rotor blade slots include a first slot side have a multiple of first lobes and a second slot side having a multiple of second lobes that are radially aligned with said multiple of first lobes;
said asymmetric slot root is asymmetric along the general slot extrusion direction; and
said asymmetric slot root is defined from a relatively larger fillet to a relatively smaller fillet on one side and from a relatively smaller fillet to a relatively larger fillet on an opposite side.

2. The rotor disk as recited in claim 1, wherein said asymmetric slot root defines a slot floor having a first fillet which blends into said first slot side and a second fillet which blends said second slot side into said slot floor, said first fillet different than said second fillet.

3. The rotor disk as recited in claim 2, wherein said asymmetric slot roots defines a slot floor having a first fillet which blends into said first slot side and a second fillet which blends said second slot side into said slot floor, said first fillet smaller than said second fillet.

4. The rotor disk as recited in claim 2, wherein said first slot side is a suction side and said second slot side is a pressure side.

5. The rotor disk as recited in claim 2, wherein said first slot side defines a multiple of first lobes and a multiple of first pockets and said second slot side is a pressure side defines a multiple of second lobes and a multiple of second pockets.

6. The rotor disk as recited in claim 3, wherein said first fillet is defined by a first multiple of radii and said second fillet defines a second multiple of radii, a smallest of said first multiple of radii smaller than a smallest of said second multiple of radii.

7. The rotor disk as recited in claim 1, further comprising:
a hub which defines an axis of rotation; and
a web which extends between said hub and said rim.

8. The rotor disk as recited in claim 1, wherein said asymmetric slot roots defines a tangency of said slot floor non-perpendicular to a generally radial blade axis.

9. The rotor disk as recited in claim 1, wherein said asymmetric slot root is non-parallel to an axis of rotation.

10. The rotor disk as recited in claim 1, further comprising a rotor blade mountable within each of said multiple of rotor blade slots.

11. The rotor disk as recited in claim 1, further comprising a turbine rotor blade mountable within each of said multiple of rotor blade slots.

12. A rotor disk for a gas turbine engine comprising:
a rim that defines a multiple of rotor blade slots, at least one of said multiple of rotor blade slots having an asymmetric slot root that is asymmetric along the general slot extrusion direction; and
wherein said asymmetric slot root is defined from a relatively larger fillet to a relatively smaller fillet on one side and from a relatively smaller fillet to a relatively larger fillet on an opposite side.

* * * * *